United States Patent

[11] 3,562,557

[72] Inventor John M. P. Gates
Portland, Oreg.

[21] Appl. No. 708,855
[22] Filed Feb. 28, 1968
[45] Patented Feb. 9, 1971
[73] Assignee Tektronix, Inc.
Beaverton, Oreg.
a corporation of Oregon

[54] COMPLEMENTARY TRANSISTOR CIRCUIT FOR DRIVING AN OUTPUT TERMINAL FROM ONE VOLTAGE LEVEL TO ANOTHER, INCLUDING TRANSISTOR COUPLING MEANS BETWEEN COMPLEMENTARY TRANSISTORS

7 Claims, 3 Drawing Figs.

[52] U.S. Cl. .......... 307/255, 307/246; 315/18
[51] Int. Cl. .......... H03k 17/60
[50] Field of Search .......... 307/246, 255, 313; 315/18

[56] References Cited

UNITED STATES PATENTS

| | | | |
|---|---|---|---|
| 2,864,007 | 12/1958 | Clapper | 307/255 |
| 2,933,692 | 4/1960 | Meyers | 307/255X |
| 3,140,406 | 7/1964 | Thompson | 307/313X |
| 3,157,797 | 11/1964 | Eshelman | 307/246 |
| 3,171,984 | 3/1965 | Eshelman et al. | 307/246X |
| 3,444,393 | 5/1969 | Sassler | 307/313X |

*Primary Examiner*—Stanley D. Miller, Jr.
*Attorney*—Buckhorn, Blore, Klarquist and Sparkman

ABSTRACT: A circuit for driving a cathode ray tube deflection blanking plate or the like comprises a pair of complementary transistors having their collector electrodes coupled to such blanking plate, and having their respective emitters coupled to positive and negative voltage points. Means interconnect the transistor bases for coupling a signal therebetween. The transistors are biased so that one is normally cut off while the other is in saturation. An input provided to one such transistor reverses the states of both transistors so that the transistor which was previously cut off now saturates, and the previously conducting transistor is cut off. The cathode ray tube blanking plate is thereby rapidly driven from one voltage level to another.

JOHN M. P. GATES
*INVENTOR*
*BY*
*BUCKHORN, BLORE, KLARQUIST & SPARKMAN*
*ATTORNEYS*

COMPLEMENTARY TRANSISTOR CIRCUIT FOR DRIVING AN OUTPUT TERMINAL FROM ONE VOLTAGE LEVEL TO ANOTHER, INCLUDING TRANSISTOR COUPLING MEANS BETWEEN COMPLEMENTARY TRANSISTORS

BACKGROUND OF THE INVENTION

During the blanking and unblanking of a cathode ray tube display, a given cathode ray tube electrode may be driven from a positive voltage to a relatively negative voltage or ground. The cathode ray tube electrode structure and connecting leads present a certain amount of stray capacitance, so the drive must be sufficient to supply displacement current to the stray capacitance for fast switching. A usual circuit for driving the blanking electrode in a cathode ray tube comprises an ordinary amplifier having its output terminal connected to the blanking electrode of the cathode ray tube, the output terminal being returned to a supply potential by way of a load resistor. The load resistor must not have too large a value or the time for charging the aforementioned stray capacitance can be excessive as compared with the speed at which blanking or unblanking must take place. Therefore, an amplifier of this type including a load resistor causes constant power dissipation in the system in one or both of the voltage states. In modern, portable, battery-operated equipment, excessive power dissipation is undesirable since it shortens battery life.

SUMMARY OF THE INVENTION

According to the present invention, an output terminal such as, for example, a terminal connected to a deflection blanking electrode of a cathode ray tube, is driven by a pair of complementary transistors. That is, one transistor is a PNP type and the other transistor is an NPN type. Means are connected between the bases of the two transistors for coupling a signal therebetween, and the transistor bases are biased such that one transistor is normally conducting in saturation while the other is normally cut off. An input applied to one of the transistors switches the conductive states of both transistors whereby the previously conducting transistor is cut off, and the previously nonconducting transistor is driven to saturation. In this manner, the output terminal, e.g. the terminal connected to a cathode ray blanking electrode, may be rapidly driven between a relatively negative voltage point and a relatively positive voltage point, at the same time rapidly charging stray capacitance and the like. No power dissipating resistor is employed.

It is accordingly an object of the present invention to provide an improved circuit for driving an output terminal between a pair of voltage levels without the necessity of employing elements dissipating excessive power in the quiescent state.

It is a further object of the present invention to provide improved means for driving a blanking electrode of a cathode ray tube between voltage levels while supplying displacement current for stray circuit capacitance to facilitate rapid switching.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figures 1, 2:
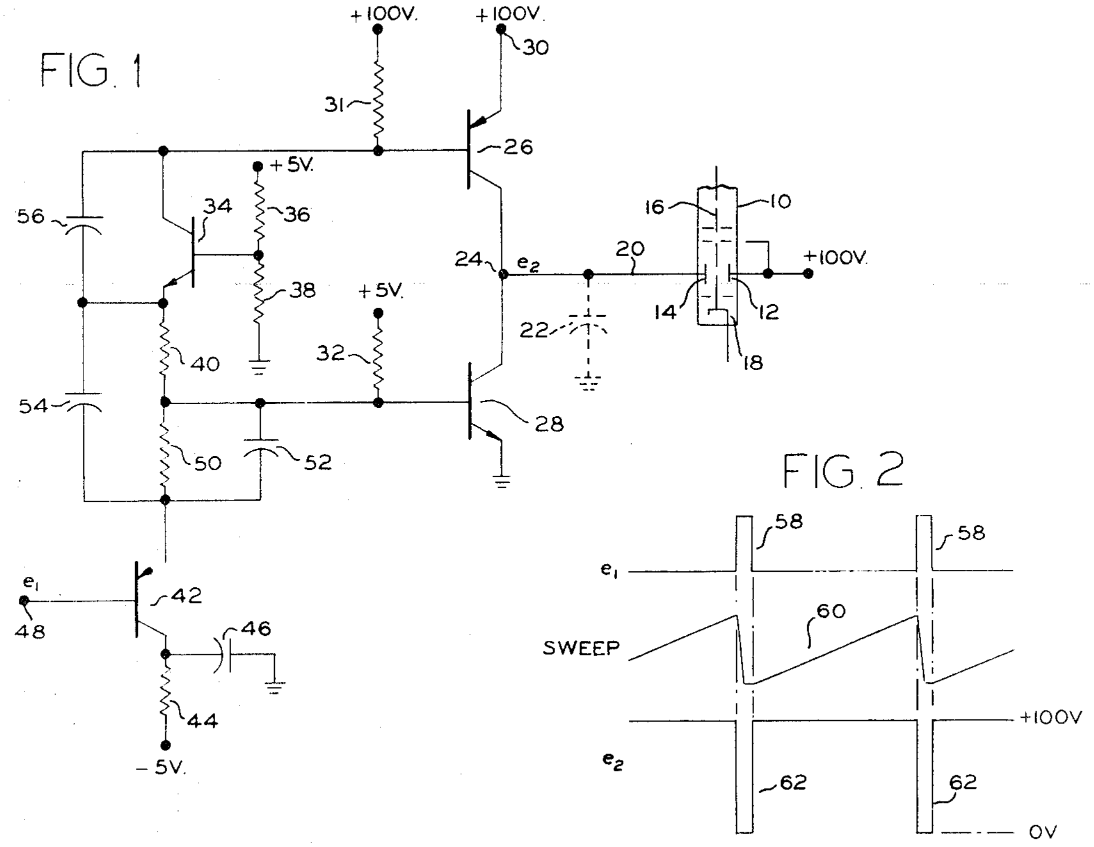
FIG. 1 is a schematic diagram of a circuit according to a first and preferred embodiment of the present invention.
FIG. 2 is a waveform chart illustrating operation of the FIG. 1 circuit.

Referring to FIG. 1, a cathode ray tube, illustrated partially at 10, includes a pair of blanking plates 12 and 14. Plate 12 is connected to a positive voltage, e.g. a+100 volts while the opposite plate, plate 14, is driven between a positive voltage, for example a positive 100 volts, and a negative voltage or ground. When the potential of plate 14 is approximately the same as that of plate 12, electron beam 16 emitted from cathode 18 will pass between plates 12 and 14 without substantial deflection by the blanking plates. However, if plate 14 is grounded, electron beam 16 will be attracted strongly towards plate 12. In this manner the beam may be directed away from the longitudinal path illustrated for effectively blanking the cathode ray tube screen (not shown). The blanking plate 14 and the lead 20 connecting thereto have stray capacitance to ground indicated by capacitor 22. The displacement current of this stray capacitance must be supplied when driving plate 14 between +100 volts and ground, and then back to 100 volts again.

According to the present invention, a circuit includes an output terminal 24 connected to lead 20 and to blanking plate 14. This circuit is effective for driving the output terminal and the blanking plate between a pair of voltage levels and does not employ a power dissipating load resistor. The circuit includes a pair of controlled devices comprising complementary transistors 26 and 28, having both their collector electrodes connected to output terminal 24. Transistor 26 is a PNP transistor and has its emitter coupled to a relatively positive voltage supply terminal 30, here provided with a potential of +100 volts. Transistor 28 is an NPN transistor and has its emitter electrode connected to a relatively negative voltage supply terminal, here indicated as ground. Resistor 31 connects the base of transistor 26 to +100 volts, while resistor 32 connects the base of transistor 28 to a +5 volts. Therefore, in the absence of further input to the transistors, transistor 26 will be biased beyond cutoff, and resistor 32 provides base current for keeping transistor 28 saturated. At such time, output terminal 24 and blanking plate 14 are substantially grounded through the collector-emitter path of transistor 28.

The bases of transistors 26 and 28 are driven in phase by the same input driving means, such input driving means including means for providing signal drive to them in the presence of a voltage difference between the bases. In the FIG. 1 embodiment the means for coupling a signal between the bases of transistors 26 and 28 includes NPN transistor 34, connected in a common base amplifier circuit, having its base connected to the center tap of a voltage divider comprising resistors 36 and 38 disposed between a +5 volts and ground. Resistors 36 and 38 normally bias transistor 34 in a nonconducting state. The collector of transistor 34 is connected to the base of transistor 26, and the emitter of transistor 34 is coupled to the base of transistor 28 by way of resistor 40. The input means further includes a PNP transistor 42 connected in an emitter-follower configuration, with its collector returned to a −5 volts through resistor 44 while being bypassed to ground by capacitor 46.

A voltage waveform designated $e_1$ is applied at input terminal 48 which is connected to the base of PNP transistor 42. The emitter of transistor 42 is coupled to the base of transistor 28 by resistor 50, providing substantially the same waveform to the base of transistor 28. Transistor 42 furnishes low impedance drive for achieving fast rise time operation. A speed-up capacitor 52 is shunted across resistor 50 and a similar capacitor 54 is shunted across resistors 40 and 50 in series. Yet another speed-up capacitor 56 is connected between the emitter and collector electrodes of transistor 34.

The operation of the FIG. 1 circuit will be discussed with reference to the FIG. 2 waveform chart wherein the input waveform $e_1$ is indicated as a negative voltage level interrupted by a series of positive pulses 58. By way of example, the input waveform is taken to vary between +1 volts and −1 volts for the FIG. 1 embodiment. Pulses 58 are synchronized with the sweep waveform 60 which may be applied to cathode ray tube beam deflection plates (not shown). A pulse 58 occurs at the end of each sweep sawtooth for bringing about blanking of the electron beam 16 through deflection of the same off the screen during the retrace of sweep waveform 60. The circuit of FIG. 1 provides an output voltage waveform $e_o$ at terminal 24 which comprises a series of negative-going pulses 62 having the same duration as pulses 58, employed for dropping blanking plate 14 from 100 volts to ground level.

As the negative one volt portion of the input waveform $e_1$ (between pulses 58) is applied at terminal 48, transistor 42 is caused to conduct. Substantially the same negative voltage appears at the emitter of transistor 42 and is applied through resistor 50 to the base of transistor 28 causing the latter transistor to become but off. Also, the emitter of transistor 42 is coupled to the emitter of transistor 34 through resistors 50 and 40, whereby transistor 34 is caused to conduct. Transistor 34 draws current through resistor 31 dropping the voltage at the base of transistor 26 whereby the latter transistor saturates, with the collector of transistor 34 drawing current through both resistor 31 and transistor 26. Therefore, the output $e_o$ at terminal 24 resides at approximately 100 volta at this time, inasmuch as transistor 26 is saturated, and transistor 28 is cut off.

The potentials at the bases of transistors 42 and 34 determine the voltage across resistors 40 and 50, and therefore the current through these resistors and transistor 34. The collector current of transistor 34 saturates transistor 26 by overdriving the base of transistor 26. The values of resistors 40 and 50 are chosen relative to one another so that with transistors 42 and 34 conducting, the voltage at the base of transistor 28 is sufficient to cut off transistor 28.

Upon the occurrence of a positive pulse 58 in the input waveform, transistor 42 is cut off. Similarly, the voltage at the emitter of transistor 42 and therefore at the emitter of transistor 34 is high enough so that transistor 34 is cut off. As a result, transistor 26 will be cut off since the base thereof is effectively connected to a positive 100 volts through resistor 31. At this time, the current through resistor 32 to the base of transistor 28 is sufficient to saturate the latter transistor whereby the voltage at output terminal 24 drops substantially to 0 volts or ground.

Excursions of voltage at output terminal 24 are rapid despite the presence of stray capacitance 22, and the displacement current therefor is readily provided. The displacement current is substantially the only current flowing in output lead 20, and in the collectors of transistors 26 and 28, and this current flow takes place substantially only during transition times of waveforms $e_1$ and $e_o$. No load resistor is employed, but rather transistor 26 is located in the position taken by the load resistor in the usual circuit. Capacitors 52, 54, and 56 enhance the speed of circuit operation since they quickly convey voltage changes at the emitter of transistor 42 to the bases of transistors 26 and 28, and to the emitter of transistor 34. It is understood that the circuit of the present invention finds particular utility in driving a blanking electrode of a cathode ray tube, but the circuit's usefulness is not limited thereto.

Figure 3:
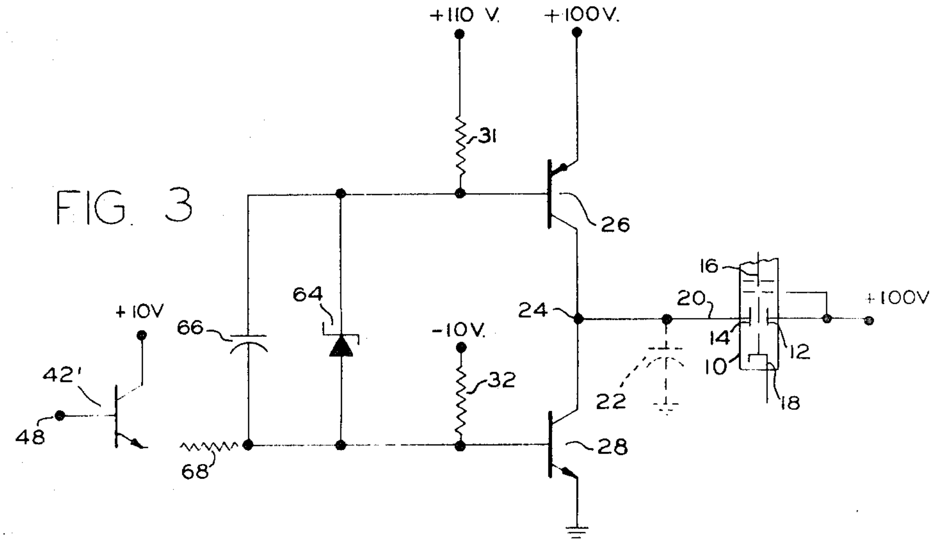
FIG. 3 is a schematic diagram of a circuit according to a second embodiment of the present invention.

An alternative form of the present invention is illustrated in FIG. 3 wherein similar elements are referred to by similar reference numerals. Again, transistors 26 and 28 have their collector electrodes connected in common to an output terminal 24, which is connected by way of lead 20 to a blanking plate or the like, 14. Bias resistors 31 and 32 are connected to a +110 volt terminal and a −10 volt terminal respectively.

In this circuit, the collector of emitter-follower connected NPN input transistor 42' is connected to +10 volts, and the emitter of transistor 42' is coupled through resistor 68 to the base of transistor 28. A zener diode 64 is interposed between the base of transistor 28 and the base of transistor 26 for maintaining a voltage difference between such electrodes. Therefore a signal can be coupled therebetween via zener diode 64. The anode of the zener diode is connected to the base of transistor 28, and the cathode thereof is connected to the base of transistor 26, while a speed-up capacitor 66 may be shunted across the zener diode. A waveform similar to $e_1$ in FIG. 2 may be applied to terminal 48 in the FIG. 3 circuit such that between pulses 58, the base of transistor 42' is below ground level and therefore transistor 42' is nonconducting. A voltage divider comprising resistors 31 and 32, and zener diode 64, provides a negative voltage at the base of transistor 28 at this time whereby the latter transistor is cut off. A constant voltage drop takes place across zener diode 64 so that when the voltage is low at its anode terminal, the voltage is also low at its cathode terminal. The voltage differential is such that when transistor 28 is cut off, the voltage at the base of transistor 26 causes transistor 26 to saturate. The voltage divider comprising resistors 31 and 32, and zener diode 64, thus normally establishes appropriate voltage levels at the bases of transistors 26 and 28 for causing transistor 26 to conduct and for causing transistor 28 to be cut off.

When a positive-going pulse 58 reaches terminal 48 of the FIG. 3 circuit, transistor 42 conducts, providing current through resistors 68 and 32 for raising the voltage at the base of transistor 28 whereby the latter transistor saturates. The same voltage rise, coupled via zener diode 64, cuts off transistor 26. As in the previous circuit, an output pulse 62 is produced for dropping the voltage at output terminal 24 from approximately 100 volts to ground level.

It is understood that small values of resistance may be included in the circuit, for example in the collector leads of transistors 26 and 28 for adjusting circuit time constants and the like, without dissipating appreciable power.

While I have shown and described plural embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A circuit for driving an input terminal between a pair of voltage levels represented at a pair of voltage supply terminals comprising:

a pair of complementary transistors having their collectors coupled in driving relation to the same output terminal, wherein the transistor emitters are connected to respective voltage supply terminals in a conducting polarity sense;

means for biasing said transistors so that one transistor is nonconducting when the other transistor conducts to a substantial extent; and common input means for said transistors for causing conduction and non-conduction thereof by driving the bases of said transistors in phase through coupling of a signal therebetween in the presence of a voltage difference between the bases of said transistors, said common input means comprising a third transistor connected in a common base amplifier configuration with the emitter of said third transistor being coupled to the base of one of said complementary transistors, the collector of said third transistor being coupled to the base of the other of said complementary transistors, and means coupling the base of said third transistor to a reference potential.

2. The circuit according to claim 1 further including an emitter follower transistor for driving the emitter of said third transistor as well as the base of the one of said pair of transistors to which the emitter of the third transistor is connected.

3. The circuit according to claim 1 wherein;

said pair of transistors comprises an NPN transistor and a PNP transistor, the emitter of the PNP transistor being coupled to a relatively positive voltage terminal, and the emitter of the NPN transistor being coupled to a relatively negative voltage terminal, and wherein said third transistor has its emitter coupled to the base of said NPN transistor and its collector coupled to the base of said PNP transistor.

4. The circuit according to claim 2 wherein said common input means further comprises a first capacitor coupling the emitter of said emitter follower transistor to the base of said one of said transistors, a second capacitor coupling the emitter of said emitter follower transistor to the emitter of said third transistor, and a third capacitor coupling the emitter of said third transistor to the base of the said other of said transistors.

5. The circuit according to claim 4 further comprising a voltage divider disposed between the emitter of said emitter follower transistor and the emitter of said third transistor, with the base of said one of said transistors being coupled to a tap on said voltage divider.

6. The circuit according to claim 5 further including resistors respectively returning the bases of said pair of complementary transistors to sources of positive voltage.

7. In a cathode ray tube apparatus wherein the cathode ray tube thereof includes electrode means for blanking and unblanking the screen of said cathode ray tube, an operating circuit for said electrode means comprising:

positive and negative voltage supply terminals;

a PNP transistor having its emitter electrode connected to said positive voltage supply terminal, and its collector electrode connected to said cathode ray tube electrode means;

an NPN transistor having its emitter connected to said negative voltage supply terminal and its collector connected to said cathode ray tube electrode means;

biasing means connected to said transistors for biasing said transistors to opposite conductivity states;

and means for driving said transistors between conducting and nonconducting states, including means for coupling a signal between the bases of said NPN and PNP transistors in the presence of a voltage difference therebetween so that when one transistor is driven to conduction, the other is driven to cut off, and vice versa;

said means for coupling the signal between said bases comprising a common base connected transistor having its emitter coupled to the base of said NPN transistor, its collector coupled to the base of said PNP transistor, and its base coupled to a source of reference potential; and said means for driving said transistors further comprising an emitter follower transistor having its emitter coupled to the base of said NPN transistor.